(12) United States Patent
Mane et al.

(10) Patent No.: US 11,656,856 B2
(45) Date of Patent: May 23, 2023

(54) OPTIMIZING A JUST-IN-TIME COMPILATION PROCESS IN A CONTAINER ORCHESTRATION SYSTEM

(71) Applicant: INTERNATIONAL BUSINESS MACHINES CORPORATION, Armonk, NY (US)

(72) Inventors: Amit S. Mane, Bangalore (IN); Gireesh Punathil, Kannur (IN); Suman Mitra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/450,220

(22) Filed: Oct. 7, 2021

(65) Prior Publication Data
US 2023/0115217 A1   Apr. 13, 2023

(51) Int. Cl.
*G06F 8/41* (2018.01)
*G06F 9/455* (2018.01)

(52) U.S. Cl.
CPC .......... *G06F 8/443* (2013.01); *G06F 9/45525* (2013.01)

(58) Field of Classification Search
CPC ......... G06F 8/443; G06F 9/45525; G06F 8/41
USPC ....................................................... 717/148
See application file for complete search history.

(56) References Cited

U.S. PATENT DOCUMENTS

| | | | |
|---|---|---|---|
| 6,295,643 B1 | 9/2001 | Brown | |
| 8,214,814 B2 | 7/2012 | Barsness | |
| 9,286,089 B2 | 3/2016 | Pirvu | |
| 10,042,621 B2* | 8/2018 | Kruglick | G06F 8/41 |
| 10,108,442 B1 | 10/2018 | Camarda Silva Folco | |
| 11,226,799 B1* | 1/2022 | Sundaresan | G06F 9/45516 |
| 11,586,627 B2* | 2/2023 | Bhattacharjee | G06F 16/2228 |
| 2007/0094648 A1 | 4/2007 | Post | |
| 2008/0098054 A1* | 4/2008 | Carmody | G06F 12/0269 |
| 2011/0078673 A1 | 3/2011 | Muckenhuber | |
| 2012/0204164 A1* | 8/2012 | Castanos | G06F 8/443 |
| | | | 717/153 |
| 2013/0227388 A1 | 8/2013 | Trunley | |
| 2014/0082597 A1* | 3/2014 | Chafi | G06F 8/443 |
| | | | 717/148 |

(Continued)

OTHER PUBLICATIONS

Title: Deriving Code Coverage Information from Profiling Data Recorded for a Trace-based Just-in-time Compiler, author: Christian H'aubl et al, published on 2013.*

(Continued)

*Primary Examiner* — Chameli Das
(74) *Attorney, Agent, or Firm* — Schmeiser, Olsen & Watts, LLP; Christopher Pignato

(57) ABSTRACT

An approach is provided for optimizing a just-in-time (JIT) compilation process. A source pod in a container orchestrated execution environment is determined to be saturated. Profile data from a JIT compiler, a virtual machine state, and a native-compiled code state are collected. The profile data, virtual machine state, and native-compiled code state are stored in a data structure in a persistent data repository. In response to a restart or a redeployment of the source pod and an application running on the source pod, the stored profile data, virtual machine state, and native-compiled code state are reused in a new target pod, without requiring a monitoring and an identification of hot code areas in the application after the source pod becomes saturated.

20 Claims, 7 Drawing Sheets

(56) References Cited

U.S. PATENT DOCUMENTS

| | | | |
|---|---|---|---|
| 2015/0277872 A1* | 10/2015 | Gschwind | G06F 9/45516 717/153 |
| 2016/0062878 A1* | 3/2016 | Westrelin | G06F 9/4552 717/130 |
| 2019/0235605 A1 | 8/2019 | Chenchev | |
| 2019/0370046 A1 | 12/2019 | Bharde | |
| 2020/0034365 A1* | 1/2020 | Martin | G06F 16/24554 |
| 2020/0065124 A1 | 2/2020 | Chen | |
| 2020/0226024 A1 | 7/2020 | Lin | |
| 2021/0117425 A1* | 4/2021 | Rao | H04L 67/1031 |

OTHER PUBLICATIONS

Title: AutoFDO: Automatic feedback-directed optimization for warehouse-scale applications, author: D Chen, published on 2016.*

Title: Software profiling for hot path prediction: Less is more, author: E Duesterwald, published on 2000.*

Title: Verifying a compiler for Java threads, author: A Lochbihler—published on 2010.*

Title: An infrastructure for adaptive dynamic optimization; author: D Bruening, published on 2003.*

Title: Thread tailor: dynamically weaving threads together for efficient, adaptive parallel applications, author: J Lee published on 2010.*

Criu; https://criu.org/Main_Page; Nov. 3, 2020; 3 pages.

Jeon, Sanghoon et al.; Reuse of JIT Compiled Code Based on Binary Code Patching in Javascript Engine; Journal of Web Engineering, vol. 11, No. 4 (2012); Revised Aug. 7, 2012; pp. 337-349.

Mell, Peter et al.; "The NIST Definition of Cloud Computing;" National Institute of Standards and Technology; Special Publication 800-145; Sep. 2011; 7 pages.

Overview of virtual machine snapshots in vSphere; vmware Knowledge Base; https://kb.vmware.com/s/article/1015180; Apr. 5, 2021; 9 pages.

International Search report and Written Opinion, International application No. PCT/CN2022/114440, filing date: Aug. 24, 2022, dated Nov. 11, 2022, 9 pages.

* cited by examiner

OPTIMIZING A JUST-IN-TIME COMPILATION PROCESS IN A CONTAINER ORCHESTRATION SYSTEM

BACKGROUND

The present invention relates to performance management in a container orchestrated execution environment, and more particularly to optimizing a just-in-time (JIT) compilation process in a container orchestrated execution environment.

Container technology and cloud platforms, such as the KUBERNETES® container-orchestration system, have paved the way for many software application systems that are auto-scalable and self-healing and employ off-the-shelf load balancing. KUBERNETES is a registered trademark of the LINUX® Foundation located in San Francisco, Calif. Traditional software engineering techniques and technologies have improved by using out of the box features available to software applications deployed in a cloud platform such as the KUBERNETES® platform, where the features include auto-scaling, high availability, self-healing, and automated rollout, for example. Furthermore the deployment in the cloud platform allows for optimizing some elements in the software application (e.g., elements in a JAVA® application and service stack). JAVA is a registered trademark of ORACLE® America, Inc. located in Redwood Shores, Calif.

In a typical JAVA® application, only a small subset of the code is executed frequently and the performance of the application depends primarily on how fast the sections of code in that small subset are executed. These sections of code are known as hotspots or hot code. When a virtual machine executes the JAVA® application, it does not begin compiling the code immediately. If the code in the JAVA® application is going to be executed only once, then compiling is an inefficient approach—it is faster to interpret the JAVA® bytecodes as compared to compiling and executing the code only once. If the code is a frequently-called method or a loop that runs many iterations, then compiling is worthwhile—the cycles taken to compile the code are outweighed by the savings in multiple executions of the faster compiled code.

SUMMARY

In one embodiment, the present invention provides a computer system that includes a central processing unit (CPU), a memory coupled to the CPU, and one or more computer readable storage media coupled to the CPU. The one or more computer readable storage media collectively contain instructions that are executed by the CPU via the memory to implement a method of optimizing a just-in-time (JIT) compilation process. The method includes the computer system determining that a source pod in a container orchestrated execution environment is saturated. The method further includes in response to the source pod being determined to be saturated, the computer system collecting profile data from a JIT compiler, information about a state of a virtual machine of the source pod, and a native-compiled code state of the virtual machine. The method further includes the computer system storing, in a well-defined data structure in a hierarchical manner in a persistent data repository, the collected profile data, the collected information about the state of the virtual machine of the source pod, and the collected native-compiled code state of the virtual machine. The method further includes in response to a restart or a redeployment of the source pod and an application running on the source pod, the computer system reusing the stored profile data, the stored information about the state of the virtual machine of the source pod, and the stored native-compiled code state of the virtual machine in a new target pod, without requiring a monitoring and an identification of hot code areas in the application subsequent to the source pod being saturated.

A computer program product and a method corresponding to the above-summarized computer system are also described and claimed herein.

DETAILED DESCRIPTION

Overview

Figure 1:
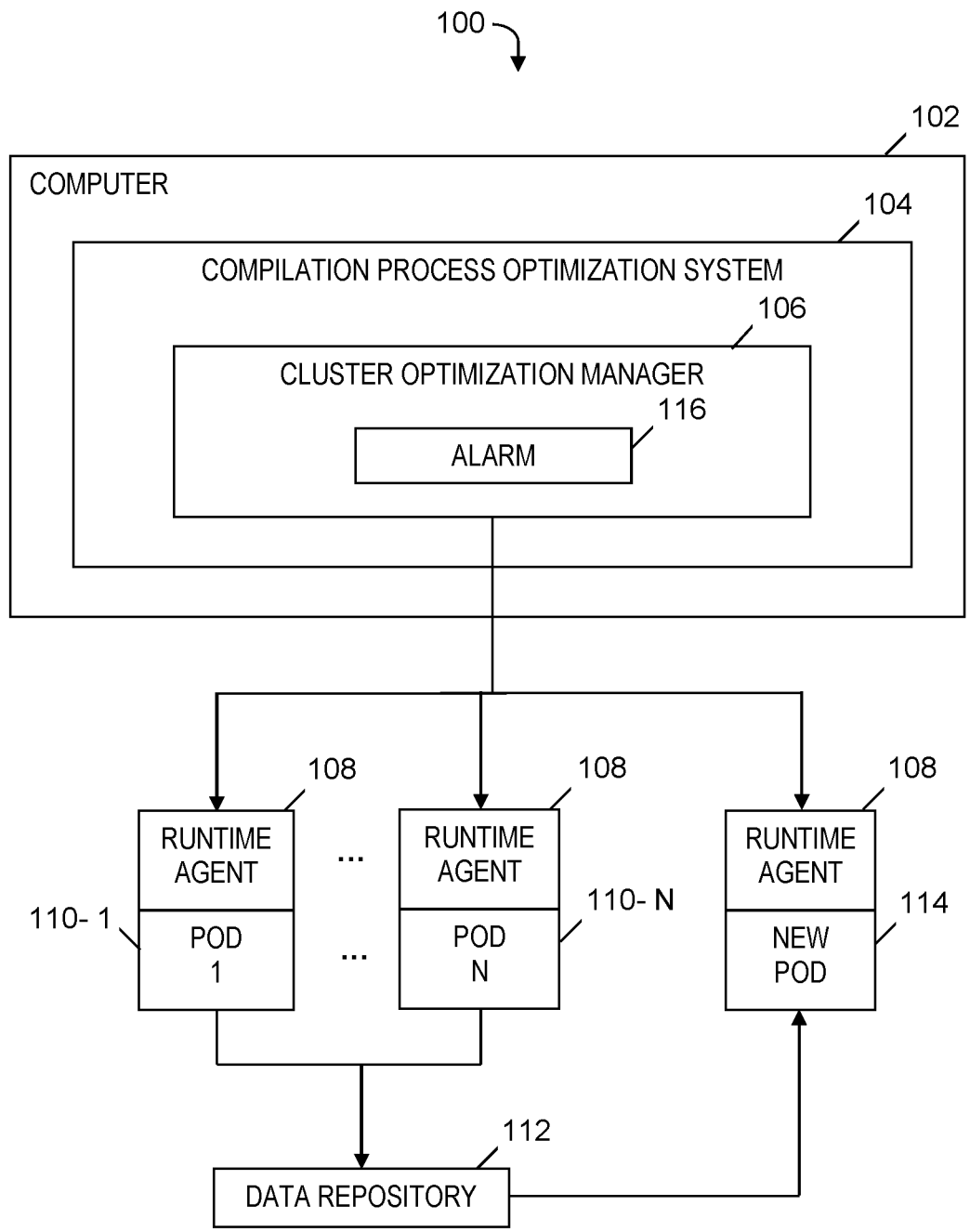
FIG. 1 is a block diagram of a system for optimizing a JIT compilation process in a container orchestrated execution environment, in accordance with embodiments of the present invention.

For containerized JAVA® applications or applications running on top of a polyglot runtime that are deployed in a cloud platform, the containers and pods hosting the applications are deployed and reclaimed multiple times over a period of time. Reasons for the aforementioned multiple times of deployment and reclaiming include rollout, auto-scaling based on an incoming load, and sudden crashes of the containers or pods. When a pod is started afresh, an entire application stack, including the JAVA® Virtual Machine (JVM®) starts afresh. JVM is a registered trademark of ORACLE® America, Inc. The JVM® system and specialty subsystems such as JIT compilers, which are part of the application stack, gather a significant amount of insights over time while the application is running. The insights are used to optimize the operations. For example, a JIT compiler monitors the execution patterns of a JAVA® application to identify hot code in the application (i.e., the methods and/or loops in the application that are executed at a frequency that exceeds a specified threshold amount). The JIT compiler optimizes the hot code by compiling the hot code to native form so that the hot code areas execute faster in comparison to an interpreted version of the same code. The identification of hot code areas and optimizing the hot code for better performance is a continuous process. The JIT compiler and the JVM® system continue to perform the aforementioned hot spot identification and optimization tasks throughout the lifetime of the application, thereby improving the performance of the application over the lifetime of the application. When the JVM® system and the JIT compiler are shut down as triggered by a cloud platform orchestrator or due to a pod or container crash, the insights gathered by the JIT compiler are lost. When the pod or container restarts or redeploys, the entire stack starts from scratch, thereby requiring a time-consuming repeat of the same process of identifying and optimizing hot code.

A JIT compiler optimizes compilation of code of an application based running the application for a significant amount of time and monitoring the execution pattern to determine hot code areas. The JIT compiler gathers information for optimization by using two counters in the JVM® system: the number of times a method has been called and the number of times any loops in the method have branched back. Branching back indicates the number of times the loop has completed execution, either because the end of the loop has been reached or because a branching statement has been executed. When the application and the JVM® system shuts down, the aforementioned information for optimization is lost.

Embodiments of the present invention address the aforementioned unique challenges related to a restart or redeployment of a pod or a container, or to an application shutdown. In one embodiment, a JIT compilation optimization system preserves the insights gathered by the JIT compiler about the hot code in the application and other application optimization characteristics in a container orchestration system. In one embodiment, the insights are stored externally and include platform agnostic aspects along with JAVA® heap, class loading, and native-compiled code structures. When a container or pod is restarted or redeployed, the preserved insights are reused by the new instance of the container or pod, thereby avoiding a time-consuming repeat of the same process of monitoring and identifying the hot code areas in the application. Instead, the JIT compiler reuses the preserved insights and starts compiling the hot code areas listed in preserved data. Since the application remains the same after the restart or redeployment, the execution patterns of the application code also remain the same. The reuse of details about the hot code areas from previous executions of the application improves the performance of the application significantly in cloud platforms, such as the KUBERNETES® platform, in which restarting of instances is commonplace. In response to a pod and an application running on the pod restarting, embodiments of the present invention allow the JIT compiler to immediately start compiling hot code areas, without wasting crucial CPU cycles in repeating the steps of monitoring and identifying hot code areas and then compiling the identified hot code.

Embodiments of the present invention reuse application optimization insights across virtual machines and real machines in a cluster topology. Embodiments of the present invention employ serialization to reuse application optimization insights. In one embodiment, the JIT compilation optimization system derives optimized code and metadata pertinent to the optimization from a fully optimized source system and transports the derived code and metadata to a target system in a serialized manner. Embodiments of the present invention adjusts object heap sizing of the target system based on the insights of the source system.

Embodiments of the present invention adjusts multiple optimizations (e.g., class hierarchy analysis, de-virtualization techniques, etc.) based on a hierarchical manner so that a specific state of the system at a given level implies an application of the optimization(s) relevant to the level below the given level.

Embodiments of the present invention use insights gathered from JIT compilation in a source system and employ the insights in a target system in a replica set within a container orchestrated cluster, which is based on the systems being identical, the workloads being identical, and most of the insights in the source system being applicable in the target system.

Embodiments of the present invention hierarchically organize insights and their data capture such that portions of the insights can be imparted based on the level of affinity the target system has with respect to the source system. Embodiments of the present invention transport the data pertinent to the insights between the systems.

Embodiments of the present invention impart performance optimizations from a saturated execution environment into a newly created execution invention, where (i) the performance optimizations include, but are not limited to, dynamic compiler optimizations, a state of the virtual machine, and virtual memory characteristics, (ii) the saturation of an environment is a state of the virtual machine where the application code is sufficiently optimized, (iii) the execution environment is a distributed computing node, and (iv) the computing node is a unit of a replica set in a container orchestration system.

Embodiments of the present invention impart the aforementioned performance optimizations using a hierarchical technique, where (i) the optimization opportunities are hierarchically classified, (ii) the hierarchy is defined based on the applicability of a type of optimization in heterogeneous execution environments, (iii) the applicability is decided based on a comparison of similar attributes of the execution environments, and (iv) the optimizations are applied where applicability exists and discarded where applicability does not exist, which leads to maximizing the imparting of optimizations between environments.

System for Optimizing a JIT Compilation Process

FIG. 1 is a block diagram of a system 100 for optimizing a JIT compilation process in a container orchestrated execution environment, in accordance with embodiments of the present invention. System 100 includes a computer 102 that includes a software-based compilation process optimization system 104 for optimizing a JIT compilation process. Compilation process optimization system 104 includes a cluster optimization manager (COM) 106, which coordinates decision-making processes and data flow related to optimizing the JIT compilation process.

System 100 includes software-based runtime agents 108, which coordinate controlling decisions on the subject runtime and data flow related to optimizing the JIT compilation process, and which work in tandem with COM 106.

COM 106 is in communication with pod 110-1, . . . , pod 110-N, where N is an integer greater than or equal to one. Pods 110-1, . . . , 110-N are saturated pods. The saturated pods are also referred to herein as source pods. As used herein, a saturated pod is defined as a pod which has run the workload for a sufficient amount of time such that the JIT compiler has optimized a portion of the total number of methods of the pod, where the portion exceeds a specified threshold amount. A pod is a basic scheduling unit of a container-orchestrated execution environment, includes one or more containers (e.g., Docker containers), and represents a single instance of a running process in a cluster.

Compilation process optimization system 104 identifies a pod that is a saturated pod by requesting via the compiler's application programming interface (API) or by inspecting the current compilation pattern. Each runtime agent 108 communicates with the underlying virtual machine (not shown) to obtain information about the state of compiled code.

Pods 110-1, ..., 110-N store the following information in predefined data structures (not shown) in a data repository 112 (i.e., a persistent volume): (1) profile data from the JIT compiler (i.e., runtime profile information of the dynamic compiler), (2) information about a state of a virtual machine of a pod (i.e., execution environment of a pod), (3) native-compiled code state of the virtual machine (i.e., compiled code characteristics of the virtual machine), and (4) augmented data from the information in (1), (2), and (3) listed above.

COM 106 is also in communication with a new pod 114 (also referred to herein as a new target pod), which is a result of respawning one of the saturated pods 110-1, ..., 110-N. The runtime system retrieves the aforementioned profile data, execution environment information, and compiled code information in the predefined data structures from data repository 112 to reuse the information in new pod 114, without requiring the process of identifying and optimizing hot code areas in new pod 114.

COM 106 includes an alarm 116, which executes a timer handler code at regular time intervals. The execution of the timer handler code captures and stores information in the aforementioned predefined data structures.

The functionality of the components shown in FIG. 1 is described in more detail in the discussion of FIG. 2, FIG. 3, FIG. 4, FIG. 5, FIG. 6, and FIG. 7 presented below.

Process for Optimizing a JIT Compilation Process

Figure 2:
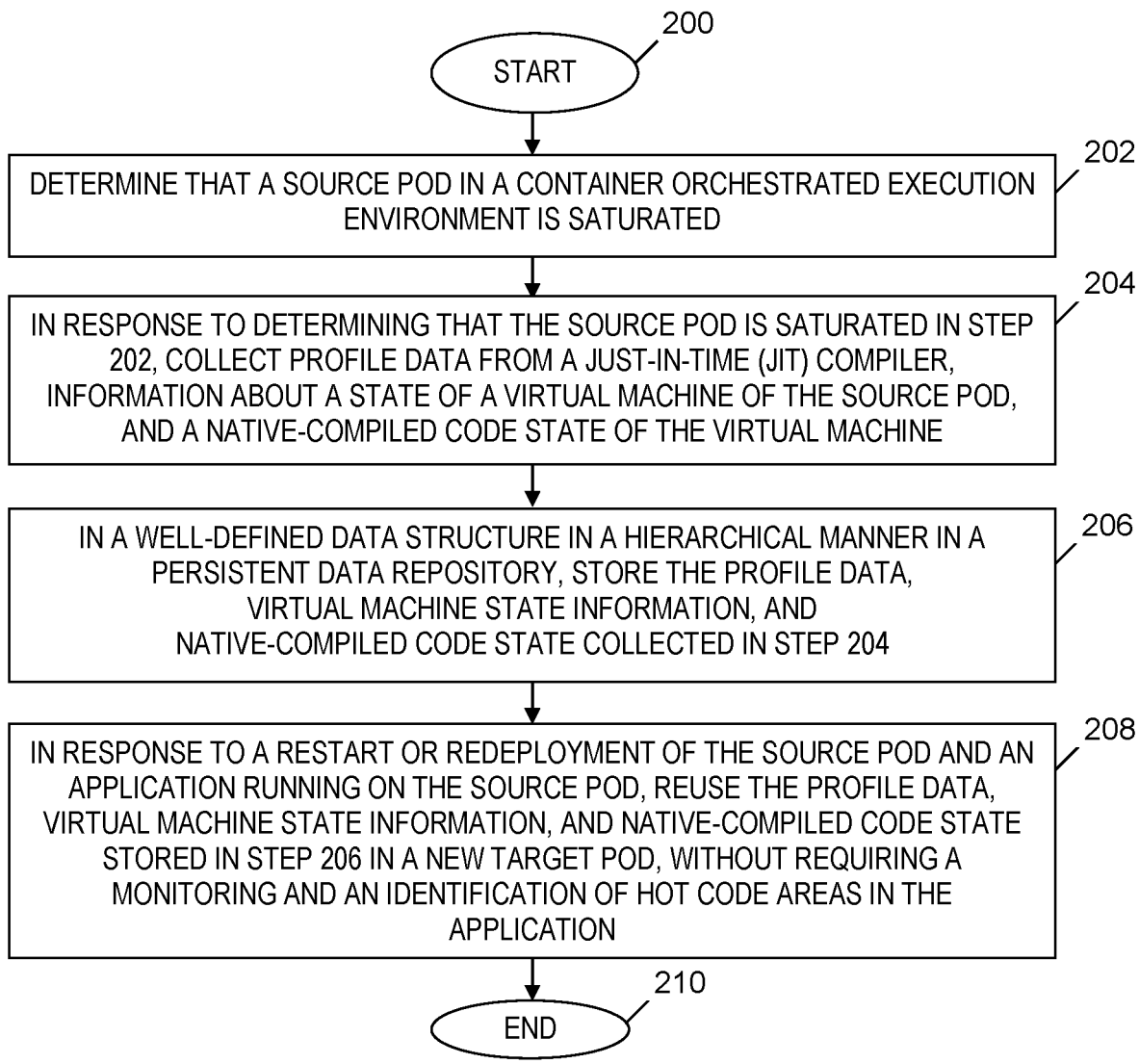
FIG. 2 is a flowchart of a process of optimizing a JIT compilation process in a container orchestrated execution environment, in accordance with embodiments of the present invention.

FIG. 2 is a flowchart of a process of optimizing a JIT compilation process in a container orchestrated execution environment, in accordance with embodiments of the present invention. The process of FIG. 2 begins at a start node 200. In step 202, compilation process optimization system 104 (see FIG. 1) determines that a source pod (i.e., one of the pods 110-1, ..., 110-N in FIG. 1) in a container orchestrated execution environment is saturated.

In step 204, in response to determining that the source pod is saturated in step 202, compilation process optimization system 104 (see FIG. 1) collects profile data from a JIT compiler, information about a state of virtual machine of the source pod, and a native-compiled code state of the virtual machine.

In one embodiment, the information about the state of the virtual machine of the source pod includes information such as a size of a JAVA® heap, a size of a compiled code heap, class loaders that have been loaded, and classes loaded (i.e., a loaded state of classes).

In one embodiment, the native-compiled code state of the virtual machine includes a compiled code cache, methods and classes corresponding to the compiled code cache, and virtual address ranges in which the methods and classes are loaded. For example, the native-compiled code state of the virtual machine includes the output from the UNIX® system pmap command. UNIX is a registered trademark of The Open Group located in Reading, Berkshire, United Kingdom.

In step 206, compilation process optimization system 104 (see FIG. 1) stores (i) the profile data, (ii) information about the state of the virtual machine, and (iii) the native-compiled code state of the virtual machine in a well-defined data structure and in a hierarchical manner, in a persistent memory or persistent volume (i.e., data repository 112 (see FIG. 1)). The data structure is well-defined because the data structure is modifiable and serializable and can be reconstructed in another execution environment. The storing of (i), (ii), and (iii) listed above is done in a hierarchical manner because each set of data is discretely used in the new pod based on its relevance and context. Data repository 112 (see FIG. 1) is persistent in that information is not lost if the saturated pod is recycled.

In step 208, in response to a restart or a redeployment of the source pod and an application running on the source pod, compilation process optimization system 104 (see FIG. 1) reuses the profile data, the information about the state of the virtual machine, and the native-compiled code state of the virtual machine in a new target pod (i.e., new pod 114 in FIG. 1), without requiring a monitoring and an identification of hot code areas in the application after the restart or redeployment.

The process of FIG. 2 ends at an end node 210.

Figure 3:
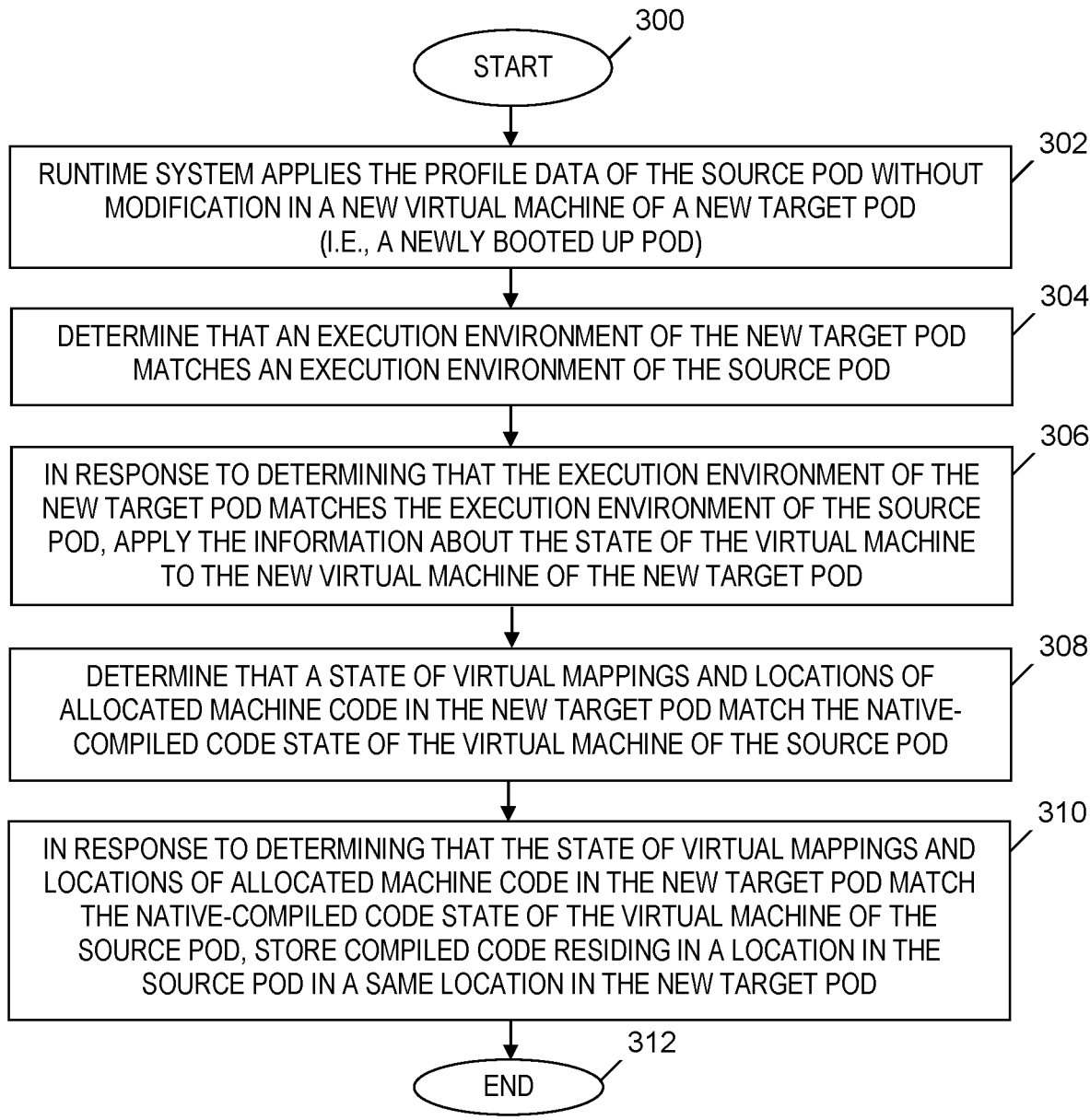
FIG. 3 is a flowchart of an optimization reuse process included in the process of FIG. 2, in accordance with embodiments of the present invention.

FIG. 3 is a flowchart of an optimization reuse process included in the process of FIG. 2, in accordance with embodiments of the present invention. The process of FIG. 3 begins at a start node 300. In step 302, a runtime system of compilation process optimization system 104 (see FIG. 1) applies the profile data of the source pod (i.e., one of the pods 110-1, ..., 110-N in FIG. 1) without modification in a new virtual machine of the new target pod (i.e., new pod 114 in FIG. 1). (i.e., a newly booted up pod). The application of the profile data in step 302 defines the compilation plans for methods. The profile data is independent of any particular execution environment and platform specificities, instead of being solely focused on the hotness of methods.

In step 304, compilation process optimization system 104 (see FIG. 1) determines that an execution environment of the new target pod matches (i.e., is comparable to) an execution environment of the source pod.

In step 306, in response to determining in step 304 that the execution environment of the new target pod matches the execution environment of the source pod, compilation process optimization system 104 (see FIG. 1) applies the information about the state of the virtual machine to the new virtual machine of the new target pod. For example, if the memory capacity of the new target pod is equal to or more than the memory capacity of the source pod, then compilation process optimization system 104 (see FIG. 1) specifies that the JAVA® heap is what was recorded in the execution environment profile data, with proper alignment rules applied. Similarly, if the loaded state of the classes and class loaders for the new target pod are the same as that of the source pod, then the additional optimizations that are applicable with respect to the class hierarchy are reused from the metadata. Examples of such optimizations include Class Hierarchy Analysis optimization and Method De-virtualization optimization.

In step 308, compilation process optimization system 104 (see FIG. 1) determines that a state of virtual mappings and locations of allocated machine code in the new target pod match (i.e., are comparable to) the state of virtual mappings and locations of the code in the source pod (i.e., the native-compiled code state of the virtual machine of the source pod).

In step 310, in response to determining in step 308 that the state of the virtual mappings and the locations of allocated machine code in the new target pod match the state of the virtual mappings and locations of code in the source pod, compilation process optimization system 104 (see FIG. 1) stores compiled code residing in a location in the source pod in a same location in the new target pod. For example, the compiled code section starts at virtual address 0x7ffffff00000000 in the source pod and the new target pod, and the compiled code of an arbitrary method Foo.foo( ) is stored in a location 0x7fffffff10000000, then compilation process optimization system 104 (see FIG. 1) stores the same compiled code in the same location in the new target pod and reuses the same compiled code in the new target pod as if the code had been compiled in the new target pod.

The process of FIG. 3 ends at an end node 312. In one embodiment, the process of FIG. 3 follows steps 202, 204, and 206 in FIG. 2.

Figure 4:
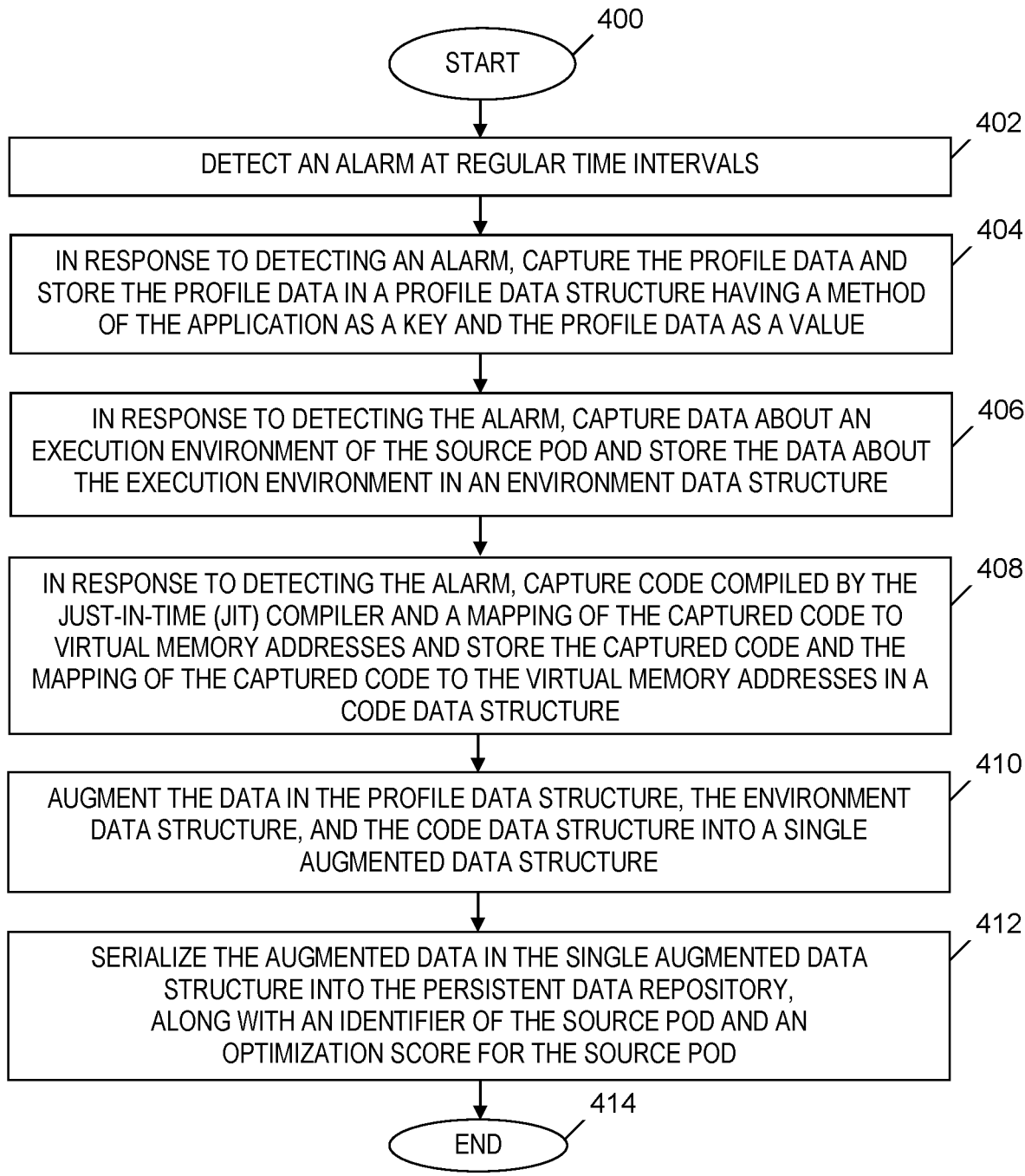
FIG. 4 is a flowchart of an optimization data transport process included in the process of FIG. 2, in accordance with embodiments of the present invention.

FIG. 4 is a flowchart of an optimization data transport process included in the process of FIG. 2, in accordance with embodiments of the present invention. The process of FIG. 4 begins at a start node 400. In step 402, the alarm 116 (see FIG. 1) is activated at regular time intervals (i.e., compilation process optimization system 104 (see FIG. 1) detects an alarm of a timer at regular time intervals). The activation of alarm 116 (see FIG. 1) executes a timer handler code with steps 404, 406, 408, 410, and 412 as described below.

In step 404, compilation process optimization system 104 (see FIG. 1) captures the profile data and stores the profile data in a profile data structure in which a method of the application is a key and the profile data is a value. If the profile data already exists, the existing profile data is updated with the new profile data.

In step 406, compilation process optimization system 104 (see FIG. 1) captures data about an execution environment of the source pod and stores the captured data about execution environment in an environment data structure. After the first capture of data about the execution environment, the environment data structure is updated in subsequent instances, as required. Some items may be unchanged (e.g., loaded classes), while other items may have changed (e.g., the managed heap).

In step 408, compilation process optimization system 104 (see FIG. 1) captures code compiled by the JIT compiler and a mapping of the captured code to virtual memory addresses, and stores the captured code and the mapping of the captured code to the virtual memory addresses in a code data structure.

The compiled code also includes a compilation level (i.e., compilation intensity or degree; e.g., cold, warm, hot, etc.) of each method of the application. Compilation process optimization system 104 (see FIG. 1) performs an aggregation over the degree of the compiled code to obtain an optimization score or optimization index for the pod at the given instance of the alarm execution. If the optimization score is already obtained in a previous instance, then the existing score is updated.

In step 410, compilation process optimization system 104 (see FIG. 1) augments the data in the profile data structure, the environment data structure, and the code data structure into a single augmented structure.

In step 412, compilation process optimization system 104 (see FIG. 1) serializes the augmented data in the single augmented data structure into the data repository 112 (see FIG. 1), along with an identifier of the source pod and an optimization score for the source pod.

The process of FIG. 4 ends at an end node 414.

In one embodiment, when a new pod is spawned, the cluster optimization manager 106 (see FIG. 1) iterates over the data in data repository 112 (see FIG. 1) and deserializes the data into in-memory structures. COM 106 (see FIG. 1) iterates over the optimization scores from each record and determines the maximum score. COM 106 (see FIG. 1) separates data elements into ones that are within its own scope and ones that need to be passed to runtime agent 108 (see FIG. 1). COM 106 (see FIG. 1) uses the extracted data to perform the assimilation. For example, COM 106 (see FIG. 1) uses the execution environment data specific to memory to initialize the pod. COM 106 (see FIG. 1) passes the other data to runtime agent 108 (see FIG. 1), which uses the data to optimize the runtime.

Computer System

Figure 5:
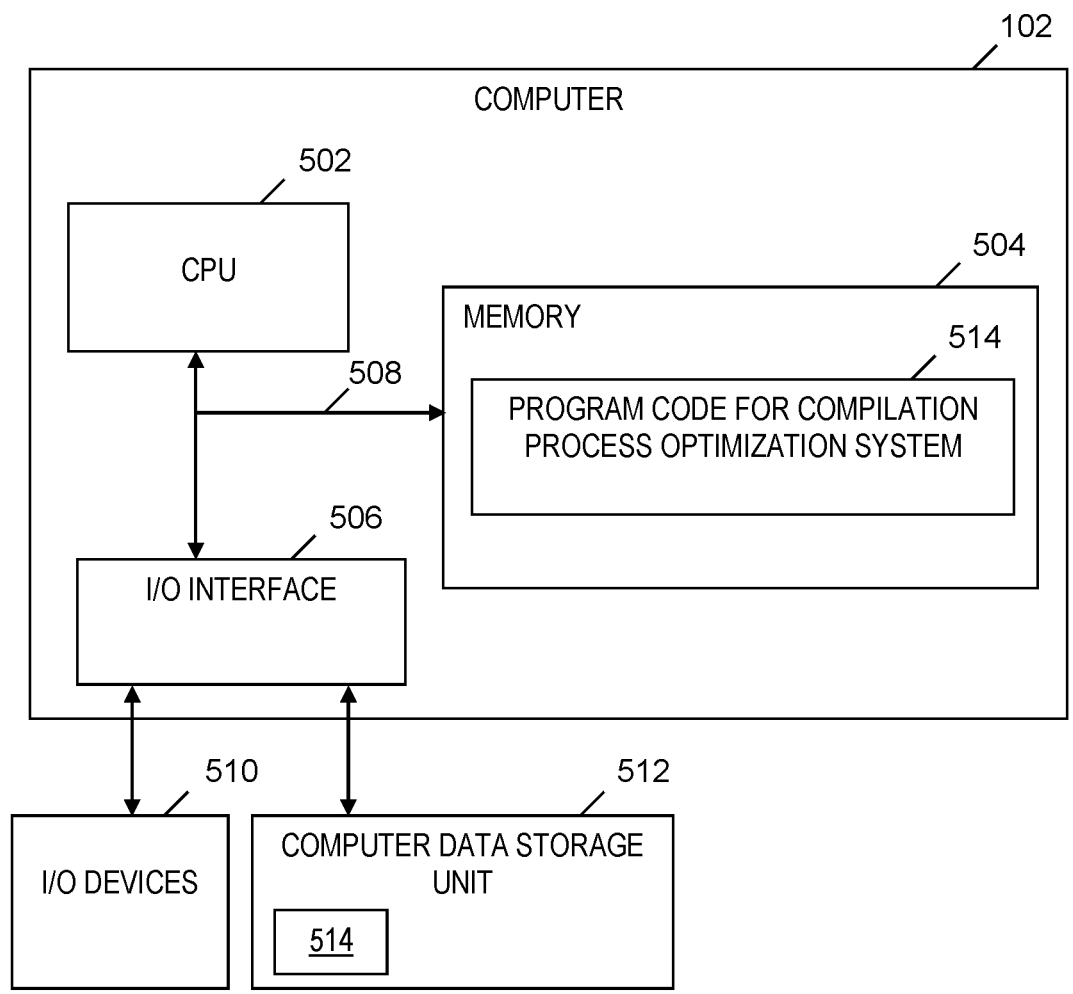
FIG. 5 is a block diagram of a computer that is included in the system of FIG. 1 and that implements the processes of FIG. 2, FIG. 3, and FIG. 4, in accordance with embodiments of the present invention.

FIG. 5 is a block diagram of a computer that is included in the system of FIG. 1 and that implements the processes of FIG. 2, FIG. 3, and FIG. 4, in accordance with embodiments of the present invention. Computer 102 is a computer system that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for compilation process optimization system 104 (see FIG. 1) to perform a method of optimizing a JIT compilation process in a container orchestrated execution environment, where the instructions are executed by CPU 502 via memory 504. CPU 502 may include a single processing unit or processor or be distributed across one or more processing units or one or more processors in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems or a plurality of computer readable storage media in various forms. Further, memory 504 can include data distributed across, for example, a local area network (LAN) or a wide area network (WAN).

I/O interface 506 includes any system for exchanging information to or from an external source. I/O devices 510 include any known type of external device, including a display, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes one or more known computer readable storage media, where a computer readable storage medium is described below. In one embodiment, computer data storage unit 512 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 504 and/or storage unit 512 may store computer program code 514 that includes instructions that are executed by CPU 502 via memory 504 to optimize a JIT compilation process in a container orchestrated execution environment. Although FIG. 5 depicts memory 504 as including program code, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimizing a JIT compilation process in a container orchestrated execution environment. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to optimize a JIT compilation process in a container orchestrated execution environment. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing a JIT compilation process in a container orchestrated execution environment.

While it is understood that program code 514 for optimizing a JIT compilation process in a container orchestrated execution environment may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing a JIT compilation process in a container orchestrated execution environment. In this case, the service provider can create, maintain, support, etc. a computer infrastructure that performs the process steps for one or more customers. In return, the service provider can receive payment from the customer (s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
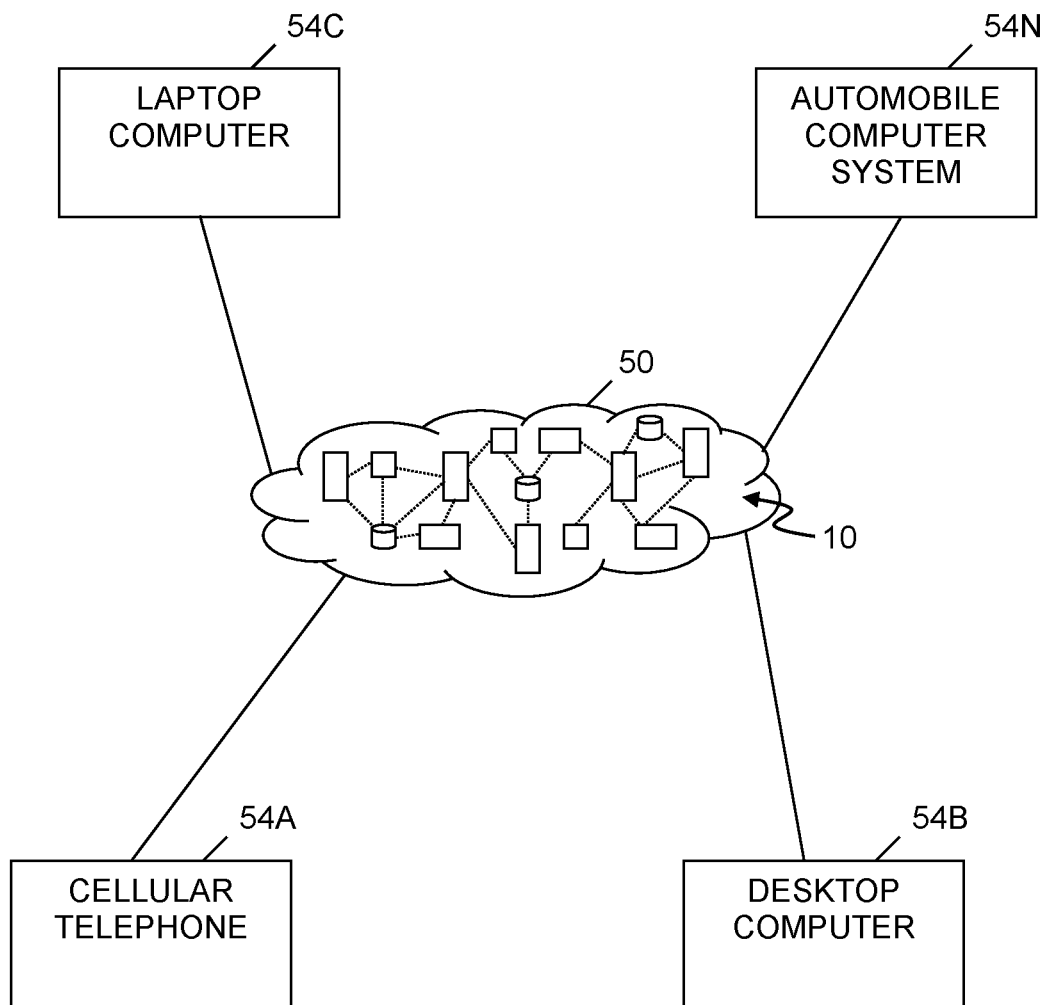
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
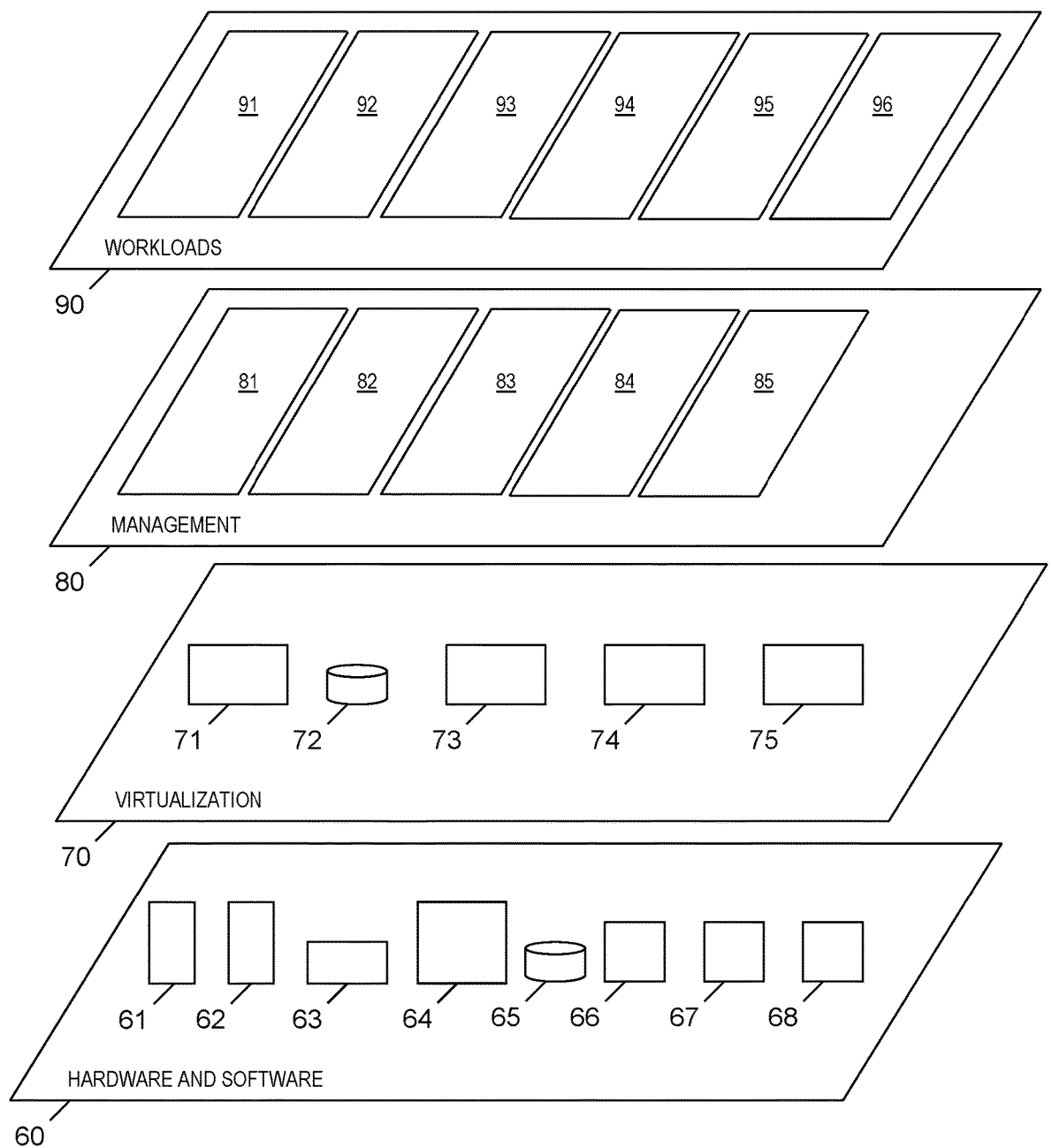
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compilation process optimization 96.

What is claimed is:

1. A computer system comprising:
    a central processing unit (CPU);
    a memory coupled to the CPU; and
    one or more computer readable storage media coupled to the CPU, the one or more computer readable storage media collectively containing instructions that are executed by the CPU via the memory to implement a method of optimizing a just-in-time (JIT) compilation process, the method comprising:
        the computer system determining that a source pod in a container orchestrated execution environment is saturated by determining that the source pod has run a workload in an amount of time during which a JIT compiler optimizes a portion of methods of the source pod, where the portion exceeds a threshold amount;

in response to the source pod being determined to be saturated, the computer system collecting profile data from the JIT compiler, information about a state of a virtual machine of the source pod, and a native-compiled code state of the virtual machine;

the computer system storing, in a data structure in a hierarchical manner in a persistent data repository, the collected profile data, the collected information about the state of the virtual machine of the source pod, and the collected native-compiled code state of the virtual machine; and in response to a restart or a redeployment of the source pod and an application running on the source pod, the computer system reusing the stored profile data, the stored information about the state of the virtual machine of the source pod, and the stored native-compiled code state of the virtual machine in a new target pod, without requiring a monitoring and an identification of hot code areas in the application subsequent to the source pod being saturated, wherein the reusing includes:

determining that a state of virtual address mappings and locations of allocated machine code in the new target pod match the native-compiled code state of the virtual machine of the source pod; and in response to the determining that the state of the virtual address mappings and the locations of the allocated machine code in the new target pod match the native-compiled code state of the virtual machine of the source pod, storing compiled code residing in a location in the source pod in a same location in the new target pod.

2. The computer system of claim 1, wherein the collecting the information about the state of the virtual machine includes:

the computer system collecting a size of a compiled code heap and a loaded state of classes and class loaders.

3. The computer system of claim 1, wherein the collecting the native-compiled code state of the virtual machine includes:

the computer system collecting a compiled code cache, methods and classes corresponding to the compiled code cache, and virtual address ranges in which the collected methods and classes are loaded.

4. The computer system of claim 1, wherein the reusing the stored profile data, the stored information about the state of the virtual machine of the source pod, and the stored native-compiled code state of the virtual machine in the new target pod further includes:

the computer system applying the stored profile data without modification in a new virtual machine of the new target pod;

the computer system determining that an execution environment of the new target pod matches an execution environment of the source pod; and in response to the determining that the execution environment of the new target pod matches the execution environment of the source pod, the computer system applying the information about the state of the virtual machine to the new virtual machine of the new target pod.

5. The computer system of claim 1, wherein the method further comprises:

the computer system detecting an alarm at regular time intervals; and in response to the detecting the alarm, the computer system executing a timer handler code, which includes:

capturing the profile data and storing the profile data in a profile data structure having a method of the application as a key and the profile data as a value;

capturing data about an execution environment of the source pod and storing the data about the execution environment in an environment data structure;

capturing code compiled by the JIT compiler and a mapping of the captured code to virtual memory addresses and storing the captured code and the mapping of the captured code to the virtual memory addresses in a code data structure; and augmenting data in the profile data structure, the environment data structure, and the code data structure into a single augmented data structure.

6. The computer system of claim 5, wherein the executing the timer handler method further includes:

serializing the augmented data in the single augmented data structure into the persistent data repository, along with an identifier of the source pod and an optimization score for the source pod.

7. The computer system of claim 6, wherein the method further comprises:

the computer system determining compilation levels of respective methods in the application at a time of the detected alarm, wherein a given compilation level of a given method indicates how frequently the given method is executed, and wherein the executing the timer handler code further includes:

capturing the compilation levels and storing the compilation levels in the persistent data repository; and calculating the optimization score for the source pod by aggregating the compilation levels.

8. A computer program product for optimizing a just-in-time (JIT) compilation process, the computer program product comprising:

one or more computer readable storage media having computer readable program code collectively stored on the one or more computer readable storage media, the computer readable program code being executed by a central processing unit (CPU) of a computer system to cause the computer system to perform a method comprising:

the computer system determining that a source pod in a container orchestrated execution environment is saturated by determining that the source pod has run a workload in an amount of time during which a JIT compiler optimizes a portion of methods of the source pod, where the portion exceeds a threshold amount;

in response to the source pod being determined to be saturated, the computer system collecting profile data from the JIT compiler, information about a state of a virtual machine of the source pod, and a native-compiled code state of the virtual machine;

the computer system storing, in a data structure in a hierarchical manner in a persistent data repository, the collected profile data, the collected information about the state of the virtual machine of the source pod, and the collected native-compiled code state of the virtual machine; and in response to a restart or a redeployment of the source pod and an application running on the source pod, the computer system reusing the stored profile data, the stored information about the state of the virtual machine of the source pod, and the stored native-compiled code state of the virtual machine in a new target pod, without requiring a monitoring and an identification of hot code areas in the application subsequent to the source pod being saturated, wherein the reusing includes:
  determining that a state of virtual address mappings and locations of allocated machine code in the new target pod match the native-compiled code state of the virtual machine of the source pod; and
  in response to the determining that the state of the virtual address mappings and the locations of the allocated machine code in the new target pod match the native-compiled code state of the virtual machine of the source pod, storing compiled code residing in a location in the source pod in a same location in the new target pod.

9. The computer program product of claim 8, wherein the collecting the information about the state of the virtual machine includes:
  the computer system collecting a size of a size of a compiled code heap and a loaded state of classes and class loaders.

10. The computer program product of claim 8, wherein the collecting the native-compiled code state of the virtual machine includes:
  the computer system collecting a compiled code cache, methods and classes corresponding to the compiled code cache, and virtual address ranges in which the collected methods and classes are loaded.

11. The computer program product of claim 8, wherein the reusing the stored profile data, the stored information about the state of the virtual machine of the source pod, and the stored native-compiled code state of the virtual machine in the new target pod further includes:
  the computer system applying the stored profile data without modification in a new virtual machine of the new target pod;
  the computer system determining that an execution environment of the new target pod matches an execution environment of the source pod; and
  in response to the determining that the execution environment of the new target pod matches the execution environment of the source pod, the computer system applying the information about the state of the virtual machine to the new virtual machine of the new target pod.

12. The computer program product of claim 8, wherein the method further comprises:
  the computer system detecting an alarm at regular time intervals; and
  in response to the detecting the alarm, the computer system executing a timer handler code, which includes:
    capturing the profile data and storing the profile data in a profile data structure having a method of the application as a key and the profile data as a value;
    capturing data about an execution environment of the source pod and storing the data about the execution environment in an environment data structure;
    capturing code compiled by the JIT compiler and a mapping of the captured code to virtual memory addresses and storing the captured code and the mapping of the captured code to the virtual memory addresses in a code data structure; and
    augmenting data in the profile data structure, the environment data structure, and the code data structure into a single augmented data structure.

13. The computer program product of claim 12, wherein the executing the timer handler method further includes:
  serializing the augmented data in the single augmented data structure into the persistent data repository, along with an identifier of the source pod and an optimization score for the source pod.

14. The computer program product of claim 13, wherein the method further comprises:
  the computer system determining compilation levels of respective methods in the application at a time of the detected alarm,
  wherein a given compilation level of a given method indicates how frequently the given method is executed, and
  wherein the executing the timer handler code further includes:
    capturing the compilation levels and storing the compilation levels in the persistent data repository; and
    calculating the optimization score for the source pod by aggregating the compilation levels.

15. A computer-implemented method comprising:
  determining, by one or more processors, that a source pod in a container orchestrated execution environment is saturated by determining that the source pod has run a workload in an amount of time during which a JIT compiler optimizes a portion of methods of the source pod, where the portion exceeds a threshold amount;
  in response to the source pod being determined to be saturated, collecting, by the one or more processors, profile data from the JIT compiler, information about a state of a virtual machine of the source pod, and a native-compiled code state of the virtual machine;
  storing, by the one or more processors and in a data structure in a hierarchical manner in a persistent data repository, the collected profile data, the collected information about the state of the virtual machine of the source pod, and the collected native-compiled code state of the virtual machine; and
  in response to a restart or a redeployment of the source pod and an application running on the source pod, reusing, by the one or more processors, the stored profile data, the stored information about the state of the virtual machine of the source pod, and the stored native-compiled code state of the virtual machine in a new target pod, without requiring a monitoring and an identification of hot code areas in the application subsequent to the source pod being saturated, wherein the reusing includes:
    determining that a state of virtual address mappings and locations of allocated machine code in the new target pod match the native-compiled code state of the virtual machine of the source pod; and
    in response to the determining that the state of the virtual address mappings and the locations of the allocated machine code in the new target pod match the native-compiled code state of the virtual machine of the source pod, storing compiled code residing in a location in the source pod in a same location in the new target pod.

16. The method of claim 15, wherein the collecting the information about the state of the virtual machine includes:
  collecting, by the one or more processors, a size of a compiled code heap and a loaded state of classes and class loaders.

17. The method of claim 15, wherein the collecting the native-compiled code state of the virtual machine includes:

collecting, by the one or more processors, a compiled code cache, methods and classes corresponding to the compiled code cache, and virtual address ranges in which the collected methods and classes are loaded.

18. The method of claim 15, wherein the reusing the stored profile data, the stored information about the state of the virtual machine of the source pod, and the stored native-compiled code state of the virtual machine in the new target pod further includes:
   applying, by the one or more processors, the stored profile data without modification in a new virtual machine of the new target pod;
   determining, by the one or more processors, that an execution environment of the new target pod matches an execution environment of the source pod; and
   in response to the determining that the execution environment of the new target pod matches the execution environment of the source pod, applying, by the one or more processors, the information about the state of the virtual machine to the new virtual machine of the new target pod.

19. The method of claim 15, wherein the method further comprises:
   detecting, by the one or more processors, an alarm at regular time intervals; and
   in response to the detecting the alarm, executing, by the one or more processors, a timer handler code, which includes:
      capturing the profile data and storing the profile data in a profile data structure having a method of the application as a key and the profile data as a value;
      capturing data about an execution environment of the source pod and storing the data about the execution environment in an environment data structure;
      capturing code compiled by the JIT compiler and a mapping of the captured code to virtual memory addresses and storing the captured code and the mapping of the captured code to the virtual memory addresses in a code data structure; and
      augmenting data in the profile data structure, the environment data structure, and the code data structure into a single augmented data structure.

20. The method of claim 19, wherein the executing the timer handler method further includes:
   serializing the augmented data in the single augmented data structure into the persistent data repository, along with an identifier of the source pod and an optimization score for the source pod.

* * * * *